US008000961B2

(12) United States Patent
Gao

(10) Patent No.: US 8,000,961 B2
(45) Date of Patent: Aug. 16, 2011

(54) GAIN QUANTIZATION SYSTEM FOR SPEECH CODING TO IMPROVE PACKET LOSS CONCEALMENT

(75) Inventor: Yang Gao, Mission Viejo, CA (US)

(73) Assignee: Yang Gao, Mission Viejo, CA (US)

( * ) Notice: Subject to any disclaimer, the term of this patent is extended or adjusted under 35 U.S.C. 154(b) by 771 days.

(21) Appl. No.: 11/942,102

(22) Filed: Nov. 19, 2007

(65) Prior Publication Data

US 2008/0154587 A1 Jun. 26, 2008

Related U.S. Application Data

(60) Provisional application No. 60/877,173, filed on Dec. 26, 2006.

(51) Int. Cl.
*G10L 15/26* (2006.01)

(52) U.S. Cl. .......................................................... 704/225

(58) Field of Classification Search .................. 704/225, 704/230, 500, 503, 222
See application file for complete search history.

(56) References Cited

U.S. PATENT DOCUMENTS

| | | | | |
|---|---|---|---|---|
| 7,707,034 | B2 * | 4/2010 | Sun et al. | 704/262 |
| 2004/0204935 | A1 * | 10/2004 | Anandakumar et al. | 704/230 |
| 2005/0060143 | A1 * | 3/2005 | Ehara | 704/201 |
| 2006/0271357 | A1 * | 11/2006 | Wang et al. | 704/223 |

* cited by examiner

*Primary Examiner* — Jakieda Jackson

(57) ABSTRACT

In order to recover the excitation energy quickly and keep the adaptive excitation contribution percentage in the entire excitation after bit-stream packet loss, the two excitation gains ($G_p$ 305 and $G_c$ 306) can be first transformed into the two other special parameters: one is the entire excitation energy and another is the energy ratio of the adaptive excitation contribution portion relative to the entire excitation energy. Then, the transformed parameters are quantized and sent to decoder. At the decoder side, the quantized parameters are transformed back to the original form of the gains ($G_p$ 305 and $G_c$ 306).

8 Claims, 5 Drawing Sheets

Initial CELP Speech Encoder

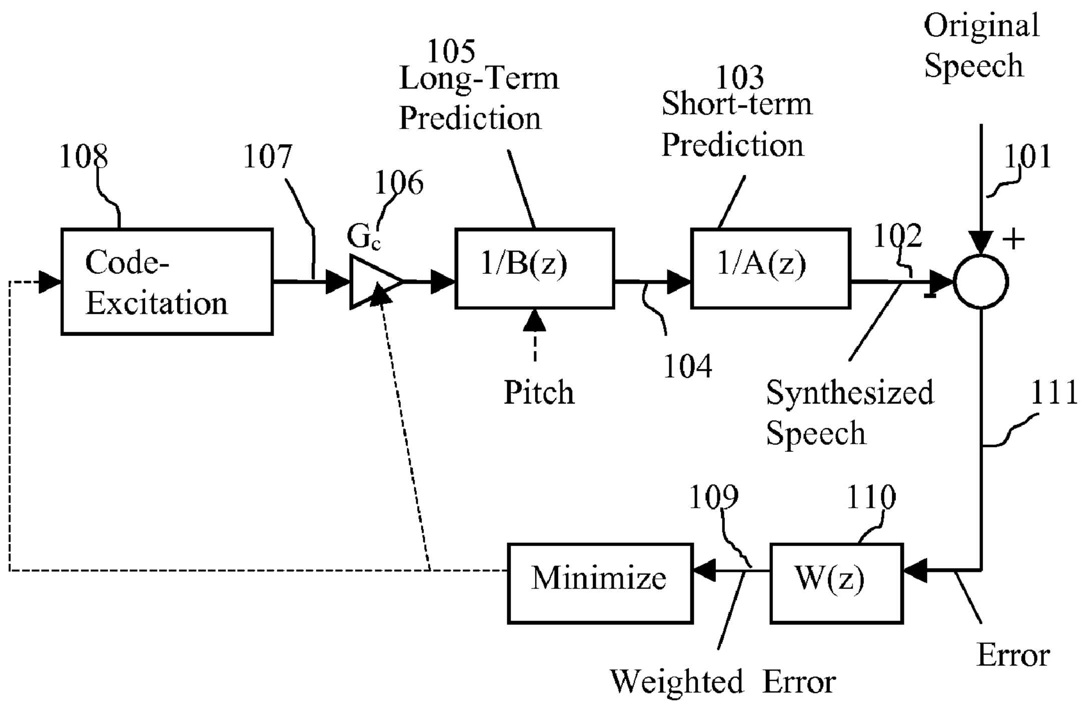
FIG. 1 Initial CELP Speech Encoder

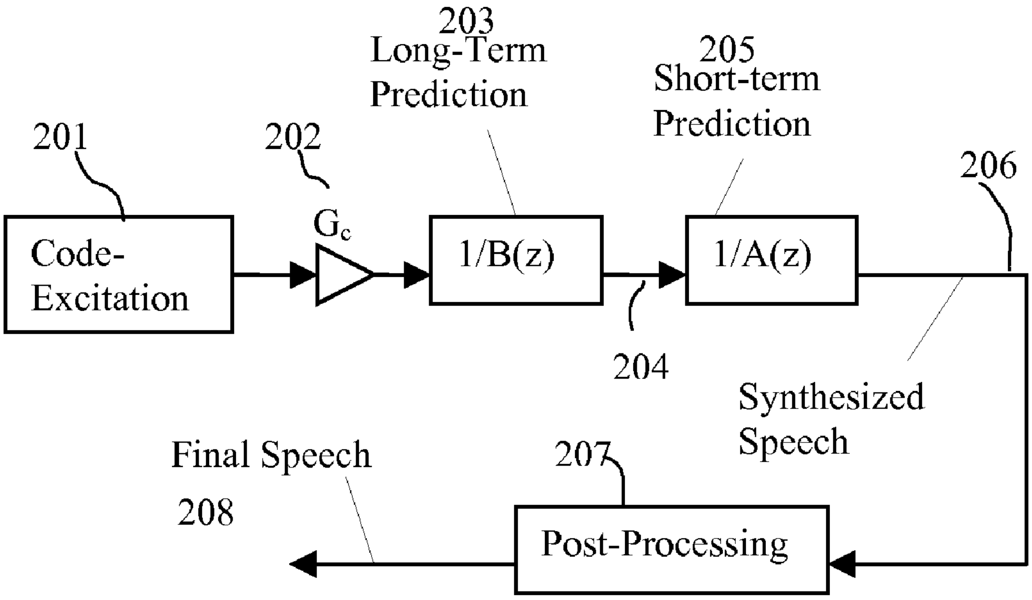
FIG. 2 Initial CELP Speech Decoder

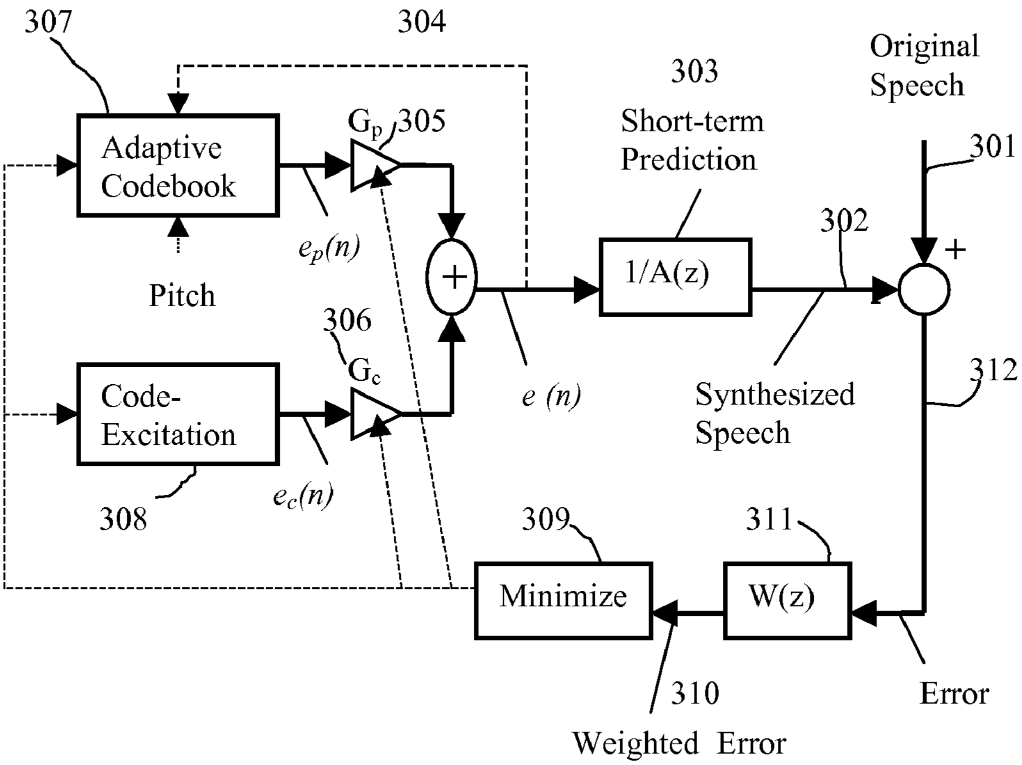
FIG.3 Basic CELP Speech Encoder

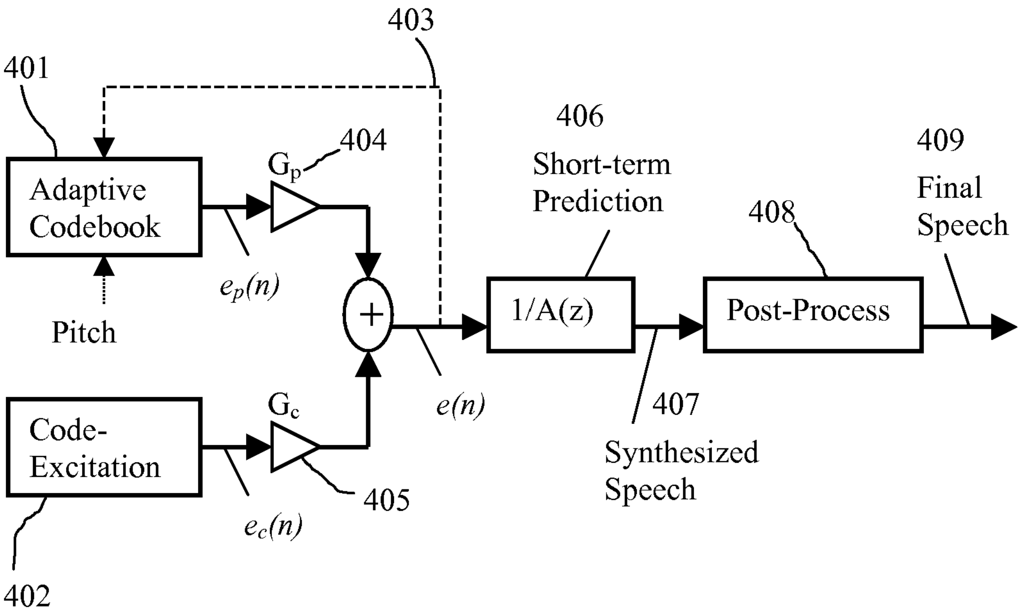
FIG.4 Basic CELP Speech Decoder

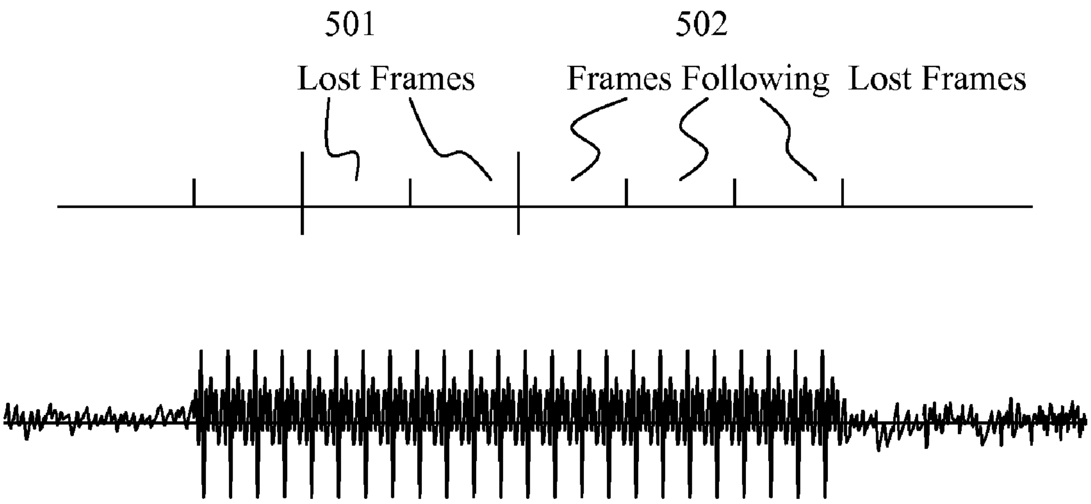
FIG. 5 Example for Bit-Stream Packet Loss

GAIN QUANTIZATION SYSTEM FOR SPEECH CODING TO IMPROVE PACKET LOSS CONCEALMENT

CROSS REFERENCE TO RELATED APPLICATIONS

Provisional Application No. US60/877,171
Provisional Application No. US60/877,172

BACKGROUND OF THE INVENTION

1. Field of the Invention

The present invention is generally in the field of signal coding. In particular, the present invention is in the field of speech coding and specifically of improving the packet loss concealment performance.

2. Background Art

Traditionally, all parametric speech coding methods make use of the redundancy inherent in the speech signal to reduce the amount of information that must be sent and to estimate the parameters of speech samples of a signal at short intervals. This redundancy primarily arises from the repetition of speech wave shapes at a quasi-periodic rate, and the slow changing spectral envelop of speech signal.

The redundancy of speech wave forms may be considered with respect to several different types of speech signal, such as voiced and unvoiced. For voiced speech, the speech signal is essentially periodic; however, this periodicity may be variable over the duration of a speech segment and the shape of the periodic wave usually changes gradually from segment to segment. A low bit rate speech coding could greatly benefit from exploring such periodicity. The voiced speech period is also called pitch, and pitch prediction is often named Long-Term Prediction. As for the unvoiced speech, the signal is more like a random noise and has a smaller amount of periodicity.

In either case, parametric coding may be used to reduce the redundancy of the speech segments by separating the excitation component of the speech from the spectral envelop component. The slowly changing spectral envelope can be represented by Linear Prediction (also called Short-Term Prediction). A low bit rate speech coding could also benefit a lot from exploring such a Short-Term Prediction. The coding advantage arises from the slow rate at which the parameters change. Yet, it is rare for the parameters to be significantly different from the values held within a few milliseconds. Accordingly, at the sampling rate of 8 k Hz or 16 k Hz, the speech coding algorithm is such that the nominal frame duration is in the range of ten to thirty milliseconds. A frame duration of twenty milliseconds seems to be the most common choice. In more recent well-known standards such as G.723, G.729, EFR or AMR, the Code Excited Linear Prediction Technique ("CELP") has been adopted; CELP is commonly understood as a technical combination of Coded Excitation, Long-Term Prediction and Short-Term Prediction. Code-Excited Linear Prediction (CELP) Speech Coding is a very popular algorithm principle in speech compression area.

FIG. 1 shows the initial CELP encoder where the weighted error 109 between the synthesized speech 102 and the original speech 101 is minimized by using a so-called analysis-by-synthesis approach. W(z) is the weighting filter 110. 1/B (z) is a long-term linear prediction filter 105; 1/A(z) is a short-term linear prediction filter 103. The code-excitation 108, which is also called fixed codebook excitation, is scaled by a gain $G_c$ 107 before going through the linear filters.

FIG. 2 shows the initial decoder which adds the post-processing block 207 after the synthesized speech.

FIG. 3 shows the basic CELP encoder which realized the long-term linear prediction by using an adaptive codebook 307 containing the past synthesized excitation 304. The periodic information of pitch is employed to generate the adaptive component of the excitation. This excitation component is then scaled by a gain $G_p$ 305 (also called pitch gain). The two scaled excitation components are added together before going through the short-term linear prediction filter 303. The two gains ($G_p$ and $G_c$) need to be quantized and then sent to the decoder.

FIG. 4 shows the basic decoder, corresponding to the encoder in FIG. 3, which adds the post-processing block 408 after the synthesized speech.

The total excitation to the short-term linear filter 303 is a combination of two components; one is from the adaptive codebook 307; another one is from the fixed codebook 308. For strong voiced speech, the adaptive codebook contribution plays important role because the adjacent pitch cycles of voiced speech are similar each other, which means mathematically the pitch gain $G_p$ is very high (around a value of 1). The fixed codebook contribution is needed for both voiced and unvoiced speech. The combined excitation can be expressed as $$e(n)=G_p \cdot e_p(n)+G_c \cdot e_c(n) \quad (1)$$

where $e_p(n)$ is one subframe of sample series indexed by n, coming from the adaptive codebook 307 which consists of the past excitation 304; $e_c(n)$ is from the coded excitation codebook 308 (also called fixed codebook) which is the current excitation contribution. For voiced speech, the contribution of $e_p(n)$ from the adaptive codebook could be significant and the pitch gain $G_p$ 305 is around a value of 1. The excitation is usually updated for each subframe. Typical frame size is 20 milliseconds and typical subframe size is 5 milliseconds.

The excitation form from the fixed codebook 308 had a long history. Three major factors influence the design of the coded excitation generation. The first factor is the perceptual quality; the second one is the computational complexity; the third one is memory size required. The very initial model of the excitation consists of random noise excitation. The noise excitation can produce good quality for unvoiced speech but may be not good enough for voiced speech. Another famous excitation model is pulse-like excitation such as Multi-Pulse Excitation in which the pulse position and the magnitude of every possible pulse need to be coded and sent to the decoder. The pulse excitation can produce good quality for voiced speech. A variant pulse excitation model is called ACELP excitation model or Binary excitation model in which each pulse position index needs to be sent to the decoder; however all the magnitudes are assigned to a constant of value 1 except the magnitude signs (+1 or −1) need to be sent to the decoder. This is currently the most popular excitation model which is used in several international standards.

Gain Quantization System can be classified as Scalar Quantization (SQ) and Vector Quantization (VQ); it can also be classified as direct quantization and indirect quantization; it could be predictive quantization or non-predictive quantization; it could further be any combination of the above mentioned approaches. Scalar Quantization (SQ) means that each parameter is quantized independently (one by one). Vector Quantization (VQ) is to quantize the parameters as a group together, which usually requires pre-memorized codebook table; and the best quantized parameter vector is selected from the table to profit from correlation between parameters. Direct quantization system makes the two gains ($G_p$ 305 and $G_c$ 306) to be quantized directly. Indirect quantization system transforms the two parameters into another group of parameters and then quantizes the transformed parameters; the quantization indexes are sent to decoder; at decoder, the parameters are transformed back into the direct domain (the original form). Predictive quantization uses the previous quantized parameters to predict the current parameter(s) and quantizes only the unpredictable portion. The prediction can help reduce the number of bits needed to quantize the parameters; but it could introduce error propagation if the bit-stream packet is lost during transmission.

This invention will propose a transformed quantization system which could recover quickly the correct excitation energy after packet loss and significantly reduce error propagation.

SUMMARY OF THE INVENTION

In accordance with the purpose of the present invention as broadly described herein, there is provided model and system for gain quantization in speech coding.

In order to recover the excitation energy quickly and keep the adaptive excitation contribution percentage in the entire excitation after bit-stream packet loss, the two gains ($G_p$ 305 and $G_c$ 306) can be first transformed into two other special parameters: one is the entire excitation energy and another is the energy ratio of the adaptive excitation contribution portion relative to the entire excitation energy. Then, the transformed parameters are quantized and sent to decoder. At the decoder side, the quantized parameters are transformed back to the original form of the gains ($G_p$ 305 and $G_c$ 306).

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 shows the initial CELP encoder.

FIG. 2 shows the initial decoder which adds the post-processing block.

FIG. 3 shows the basic CELP encoder which realized the long-term linear prediction by using an adaptive codebook.

FIG. 4 shows the basic decoder corresponding to the encoder in FIG. 3.

FIG. 5 shows an example for two frames of bit-stream packet loss.

DETAILED DESCRIPTION OF THE INVENTION

The present invention discloses a transformed gain quantization system which improves packet loss concealment quality. The following description contains specific information pertaining to the Code Excited Linear Prediction Technique (CELP). However, one skilled in the art will recognize that the present invention may be practiced in conjunction with various speech coding algorithms different from those specifically discussed in the present application. Moreover, some of the specific details, which are within the knowledge of a person of ordinary skill in the art, are not discussed to avoid obscuring the present invention.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

FIG. 1 shows the initial CELP encoder where the weighted error 109 between the synthesized speech 102 and the original speech 101 is minimized often by using a so-called analysis-by-synthesis approach. W(z) is an error weighting filter 110. 1/B(z) is a long-term linear prediction filter 105; 1/A(z) is a short-term linear prediction filter 103. The coded excitation 108, which is also called fixed codebook excitation, is scaled by a gain $G_c$ 107 before going through the linear filters. The short-term linear filter 103 is obtained by analyzing the original signal 101 and represented by a set of coefficients:

$$A(z) = \sum_{i=1}^{P} 1 + a_i \cdot z^{-i}, \quad i = 1, 2, \ldots, P \tag{2}$$

The weighting filter 110 is somehow related to the above short-term prediction filter. A typical form of the weighting filter could be $$W(z) = \frac{A(z/\alpha)}{A(z/\beta)}, \tag{3}$$

where $\beta<\alpha$, $0<\beta<1$, $0<\alpha\leqq 1$. The long-term prediction 105 depends on pitch and pitch gain; a pitch can be estimated from the original signal, residual signal, or weighted original signal. The long-term prediction function in principal can be expressed as $$B(z)=1-\beta\cdot z^{-Pitch} \tag{4}$$

The coded excitation 108 normally consists of pulse-like signal or noise-like signal, which are mathematically constructed or saved in a codebook. Finally, the coded excitation index, quantized gain index, quantized long-term prediction parameter index, and quantized short-term prediction parameter index are transmitted to the decoder.

FIG. 2 shows the initial decoder which adds the post-processing block 207 after the synthesized speech 206. The decoder is a combination of several blocks which are coded excitation 201, long-term prediction 203, short-term prediction 205 and post-processing 207. Every block except post-processing has the same definition as described in the encoder of FIG. 1. The post-processing could further consist of short-term post-processing and long-term post-processing.

FIG. 3 shows the basic CELP encoder which realized the long-term linear prediction by using an adaptive codebook 307 containing the past synthesized excitation 304. The periodic pitch information is employed to generate the adaptive component of the excitation. This excitation component is then scaled by a gain 305 ($G_p$, also called pitch gain). The two scaled excitation components are added together before going through the short-term linear prediction filter 303. The two gains ($G_p$ and $G_c$) need to be quantized and then sent to the decoder.

FIG. 4 shows the basic decoder corresponding to the encoder in FIG. 3, which adds the post-processing block 408 after the synthesized speech 407. This decoder is similar to FIG. 2 except the adaptive codebook 307. The decoder is a combination of several blocks which are coded excitation 402, adaptive codebook 401, short-term prediction 406 and post-processing 408. Every block except post-processing has the same definition as described in the encoder of FIG. 3. The post-processing could further consist of short-term post-processing and long-term post-processing.

FIG. 3 illustrates a block diagram of an example encoder capable of embodying the present invention. With reference to FIG. 3 and FIG. 4, the total excitation to the short-term linear filter 303 is a combination of two components; one is from the adaptive codebook 307; another one is from the fixed codebook 308. For strong voiced speech, the adaptive codebook contribution plays important role because the adjacent pitch cycles of voiced speech are similar each other, which means mathematically the pitch gain $G_p$ is very high. The fixed codebook contribution is needed for both voiced and unvoiced speech. The combined excitation can be expressed as $$e(n)=G_p \cdot e_p(n)+G_c \cdot e_c(n) \quad (5)$$

where $e_p(n)$ is one subframe of sample series indexed by n, coming from the adaptive codebook 307 which consists of the past excitation 304; $e_c(n)$ is from the coded excitation codebook 308 (also called fixed codebook) which is the current excitation contribution. For voiced speech, the contribution of $e_p(n)$ from the adaptive codebook could be significant and the pitch gain $G_p$ 305 is around a value of 1. The excitation is usually updated for each subframe. Typical frame size is 20 milliseconds and typical subframe size is 5 milliseconds.

The excitation form from the fixed codebook 308 had a long history. The very initial model of the excitation consisting of random noise excitation. The noise excitation can produce good quality for unvoiced speech but may be not good enough for voiced speech. Another famous excitation model is pulse-like excitation such as Multi-Pulse Excitation in which the pulse position and the magnitude of every possible pulse need to be coded and sent to the decoder. The pulse excitation can produce good quality for voiced speech. A variant pulse excitation model is called ACELP excitation model or Binary excitation model in which each pulse position index needs to be sent to the decoder; however all the magnitudes are assigned to a constant of value 1 except the magnitude signs (+1 or −1) need to be sent to the decoder. This is currently the most popular excitation model which is used in several international standards.

Gain Quantization System can be classified as Scalar Quantization (SQ) and Vector Quantization (VQ); it can also be classified as direct quantization and indirect quantization; it could be predictive quantization or non-predictive quantization; it could further be any combination of the above mentioned approaches. Scalar Quantization (SQ) means that each parameter is quantized independently (one by one). Vector Quantization (VQ) is to quantize the parameters as a group together, which usually requires pre-memorized codebook table; and the best quantized parameter vector is selected from the table to profit from correlation between parameters. Direct quantization system makes the two gains ($G_p$ 305 and $G_c$ 306) to be quantized directly. Indirect quantization system transforms the two parameters into another group of parameters and then quantizes the transformed parameters; the quantization indexes are sent to decoder; at the decoder side, the quantized parameters are transformed back into the direct domain (the original form). Predictive quantization uses the previous quantized parameters to predict the current parameter(s) and quantizes only the unpredictable portion. The prediction can help reduce the number of bits needed to quantize the parameters; but it could introduce error propagation if the bit-stream packet is lost during transmission. This invention will propose a transformed quantization system which could recover quickly the correct excitation energy after packet loss and significantly reduce error propagation.

As shown in the FIG. 3, the excitation can be expressed as in (5). For voiced speech, the contribution of $e_p(n)$ from the adaptive codebook could be significant and the gain $G_p$ is around a value of 1 so that the energy ratio of $\|G_p \cdot e_p(n)\|^2/\|e(n)\|^2$ is relatively high. For unvoiced speech, the contribution of $e_c(n)$ from the fixed codebook could be more important so that the energy ratio of $\|G_c \cdot e_c(n)\|^2/\|e(n)\|^2$ is relatively high. If the gains are directly quantized and the previous bit-stream packet is lost, the current energy of the excitation of e(n) could be far away from the correct excitation energy although the current bit-stream packet is already correctly received and the directly quantized gains ($G_p$ and $G_c$) are already correct. This is because the current adaptive excitation contribution of $e_p(n)$ is still an estimate of the previous lost excitation; one of the reasons causing the incorrect energy is that the phase relationship between $e_p(n)$ and $e_c(n)$ is changed after bit-stream packet loss. In order to recover the excitation energy quickly and keep the adaptive excitation contribution percentage in the entire excitation after bit-stream packet loss, the two gains ($G_p$ and $G_c$) can be first transformed into the two other special parameters: one is the entire excitation energy and another one is the energy ratio of the adaptive excitation contribution portion relative to the entire excitation energy.

Departing from the equation (5), the total energy of the excitation e(n) for one subframe of length L_sub can be represented as the average energy:

$$\begin{aligned} \overline{E}_e &= \|e(n)\|^2/\text{L\_sub} \\ &= \frac{\left\{ \begin{array}{c} G_p^2 \cdot \|e_p(n)\|^2 + \\ 2 \cdot G_p \cdot G_c \cdot \langle e_p(n), e_c(n) \rangle + \\ G_c^2 \cdot \|e_c(n)\|^2 \end{array} \right\}}{\text{L\_sub}} \\ &= G_p^2 \cdot A + G_p \cdot G_c \cdot B + G_c^2 \cdot C \end{aligned} \quad (6)$$

here, $$A=\|e_p(n)\|^2/L\_\text{sub},$$

$$B=2\cdot\langle e_p(n),e_c(n)\rangle/\text{L\_sub},$$

$$C=\|e_c(n)\|^2/L\_\text{sub},$$

The above A, B, and C values are already determined before doing the gain quantization. The energy parameter can be also simply defined as the combined excitation energy:

$$\begin{aligned} \overline{E}_e &= \frac{\left\{ \begin{array}{c} G_p^2 \cdot \|e_p(n)\|^2 + \\ G_c^2 \cdot \|e_c(n)\|^2 \end{array} \right\}}{\text{L\_sub}} \\ &= G_p^2 \cdot A + G_c^2 \cdot C \end{aligned} \quad (7)$$

The second transformed parameter represents the percentage energy contribution of each of the two excitation components. It can be defined as $$R_p=G_p^{\ 2}\cdot A/\overline{E}_e$$

or $$R_p=G_c^{\ 2}\cdot/\overline{E}_e \quad (8)$$

Using the group of the equations {(6), (8)} or {(7), (8)}, the original gain parameters {$G_p$ and $G_c$} are transformed into the two other parameters {$\bar{E}_e$, $\bar{R}_p$} which will be quantized and sent to the decoder. The quantization of {$\bar{E}_e$, $\bar{R}_p$} could be based on SQ or VQ in direct domain or in Log domain. After the quantization of {$\bar{E}_e$, $R_p$}, the quantization indexes are sent to decoder; at decoder side, $G_p$ is calculated back from the equation (8); then $G_c$ is computed from the equation (6) or (7). Because the transformed parameters {$\bar{E}_e$, $R_p$} are quantized and sent to decoder, the excitation energy and the excitation periodicity represented respectively by the two transformed parameters {$\bar{E}_e$, $R_p$} will be maintained after bit-stream packet loss; the correct excitation energy will be recovered faster for the packet-received frames following the packet-lost frames (see FIG. 5).

Here is an example of the quantization tables for the two transformed parameters:

$R_p$: {0.010000, 0.066667, 0.133333, 0.200000, 0.266667, 0.333333, 0.400000, 0.466667, 0.533333, 0.600000, 0.666667, 0.733333, 0.800000, 0.866667, 0.933333, 0.980000};

$\bar{E}_e$: {0.100000, 0.309747, 0.715438, 1.246790, 1.942727, 2.854229, 4.048066, 5.611690, 7.659643, 10.341944, 13.855080, 18.456401, 24.482967, 32.376247, 42.714448, 56.254879, 73.989421, 97.217189, 127.639694, 167.485488, 219.673407, 288.026391, 377.551525, 494.806824, 648.381632, 849.525815, 1112.973860, 1458.024216, 1909.952975, 2501.865431, 3277.121151, 4292.510210, 5622.413252, 7364.250123, 9645.616199, 12633.629177, 16547.170999, 21672.921696, . . . }.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A speech or signal coding method for encoding a speech signal or a general signal and improving packet loss concealment, the coding method comprising:

coding energies of two excitation components of an excitation e(n), the two excitation components comprising a first excitation component and a second excitation component, wherein the first excitation component generated by multiplying an adaptive codebook vector $e_p(n)$ with a gain $G_p$ is called an adaptive codebook excitation component, a pitch contribution excitation component or an excitation component contributed from a past synthesized excitation, wherein the second excitation component generated by multiplying a fixed codebook vector $e_c(n)$ with a gain $G_c$, is called a fixed codebook excitation component or a current excitation component contribution, and wherein the excitation e(n) is a linear combination of the two excitation components;

transforming the two gains {$G_p$, $G_c$} into other two parameters noted as {$\bar{E}_e$, $R_p$} wherein the parameter $\bar{E}_e$ represents a function of energy of the excitation e(n) or a function of energies of both the first excitation component and the second excitation component within a subframe of a frame of signal, and the other parameter $R_p$ represents a ratio of an energy of one of the two excitation components relative to $\bar{E}_e$;

encoding the two parameters {$\bar{E}_e$, $R_p$} at an encoder; and decoding the two parameters {$\bar{E}_e$, $R_p$} at a decoder.

2. The method of claim 1, comprising a Code-Excited Linear Prediction (CELP) technology.

3. The method of claim 1, wherein the function of energy of the excitation e(n) is an average excitation energy calculated by summing an energy of each of a plurality of samples of the excitation e(n) within the subframe and dividing the summed energy by a subframe size of the subframe, defined as the following:

$$\bar{E}_e = \|e(n)\|^2 / \text{L\_sub} = \frac{1}{\text{L\_sub}} \sum_n |e(n)|^2$$

L_sub is the subframe size.

4. The method of claim 1, wherein the function of energy of the excitation e(n) is an entire excitation energy calculated by summing an energy of each of a plurality of samples of the excitation e(n) within the subframe, defined as the following:

$$\bar{E}_e = \|e(n)\|^2 = \sum_n |e(n)|^2.$$

5. The method of claim 1, wherein the function of energies of both the first excitation component and the second excitation component is a combined excitation energy calculated by summing an energy of the first excitation component and an energy of the second excitation component within the subframe, defined as the following:

$$\bar{E}_e = G_p^2 \cdot \|e_p(n)\|^2 + G_c^2 \cdot \|e_c(n)\|^2$$

or $$\bar{E}_e = \{G_p^2 \cdot \|e_p(n)\|^2 + G_c^2 \cdot \|e_c(n)\|^2\} / \text{L\_sub}$$

L _sub is a subframe size of the subframe.

6. The method of claim 1, wherein the ratio $R_p$ is defined as the following:

$$R_p = \frac{G_p^2 \cdot \|e_p(n)\|^2}{G_p^2 \cdot \|e_p(n)\|^2 + G_c^2 \cdot \|e_c(n)\|^2}$$

or $$R_p = \frac{G_c^2 \cdot \|e_c(n)\|^2}{G_p^2 \cdot \|e_p(n)\|^2 + G_c^2 \cdot \|e_c(n)\|^2}$$

where $G_p^2 \cdot \|e_p(n)\|^2$ is an energy of the first excitation component within the subframe and $G_c^2 \cdot \|e_c(n)\|^2$ is an energy of the second excitation component within the subframe.

7. The method of claim 1, wherein the ratio $R_p$ is defined as the following:

$$R_p = \frac{G_p^2 \cdot \|e_p(n)\|^2}{\|e(n)\|^2}$$

or $$R_p = \frac{G_c^2 \cdot \|e_c(n)\|^2}{\|e(n)\|^2}$$

where $G_p^2 \cdot \|e_p(n)\|^2$ is an energy of the first excitation component within the subframe, $G_c^2 \cdot \|e_c(n)\|^2$ is an energy of the second excitation component within the subframe, and $\|e(n)\|^2$ is an energy of the excitation e(n) within the subframe.

8. The method of claim 1 further comprising the steps of:

quantizing the two parameters $\{\overline{E}_e, R_p\}$ at the encoder to obtain quantization indexes;

sending the quantization indexes to the decoder;

decoding the two parameters $\{\overline{E}_e, R_p\}$ by using the quantization indexes at the decoder;

transforming the two parameters $\{\overline{E}_e, R_p\}$ back to the two gains $\{G_p, G_c\}$ at the decoder; and reconstructing the excitation e(n) by using the two gains $\{G_p, G_c\}$ as the following:

$$e(n) = G_p \cdot e_p(n) + G_c \cdot e_c(n).$$

* * * * *